(12) United States Patent
Simons (10) Patent No.: US 7,417,921 B2
(45) Date of Patent: Aug. 26, 2008

(54) METHOD FOR CLASSIFYING A TYPE OF BOTTOM, MEASURING DEVICE AND COMPUTER PROGRAM PRODUCT FOR CARRYING OUT SUCH A METHOD

(75) Inventor: Dirk Gozewinus Simons, Heineoord (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 50 days.

(21) Appl. No.: 10/534,832

(22) PCT Filed: Nov. 14, 2003

(86) PCT No.: PCT/NL03/00803
§ 371 (c)(1),
(2), (4) Date: May 13, 2005

(87) PCT Pub. No.: WO2004/046760
PCT Pub. Date: Jun. 3, 2004

(65) Prior Publication Data
US 2006/0007783 A1    Jan. 12, 2006

(30) Foreign Application Priority Data
Nov. 15, 2002    (NL)    .................................    1021935

(51) Int. Cl.
*G01V 1/38* (2006.01)
(52) U.S. Cl. .............................................. 367/88
(58) Field of Classification Search .............. 367/88
See application file for complete search history.

(56) References Cited
U.S. PATENT DOCUMENTS
5,485,432 A    1/1996    Aechter et al.
5,559,754 A    9/1996    Carnaggio et al.
5,568,450 A *  10/1996    Grande et al. ................. 367/88
2003/0206489 A1 * 11/2003    Preston et al. ................ 367/88

OTHER PUBLICATIONS

Lurton X et al: "Automated Sea-bed Classification System for Echo-Sounders" Mastering the Oceans Through Technology. Newport, Rhode Island, Oct. 26-29, 1992, Proceedings of the Ocean Conference, New York, IEEE,US, vol. vol. 2, Oct. 26, 1992, pp. 317-321, XP010106931 ISBN: 0-7803-0838-7 p. 317, right-hand column, line 1—p. 318, left-hand column, line 19.
Lambert D N: "New Computerized Single Frequency Seafloor Classification System" Current Practices and New Technology in Ocean Engineering, XX, XX, vol. 13, 1998, pp. 99-105, XP002105075 p. 101, left-hand column, line 32—line 62.
Shitkovsky Y Y: "Sound Backscattering by the Ocean Bottom (History and the State of the Art)" Acoustical Physics, American Institute of Physics, New York, US, vol. 41, No. 5, Sep. 1, 1995, pp. 686-690, XP 000536485 ISSN: 1063-7710.

* cited by examiner

*Primary Examiner*—Dan Pihulic
(74) *Attorney, Agent, or Firm*—Young & Thompson (57) ABSTRACT

A method for classifying a type of bottom on a bottom under a liquid includes the steps of performing an acoustic reflection measurement, in which a first attribute is determined which represents a strength with which acoustic waves are reflected from a location on the bottom through the liquid in a reflection direction. Further, the method includes the steps of performing an acoustic scattering measurement, in which a second attribute is determined of acoustic waves that are scattered form the location on the bottom; providing a search unit, which contains information with regard to different combinations of the values of the first and second attributes, and associates the combinations with respective bottom classifications; and identifying a bottom classification of the location on the basis of the bottom classification which the search unit associates with a combination of the first and second attributes.

17 Claims, 6 Drawing Sheets

METHOD FOR CLASSIFYING A TYPE OF BOTTOM, MEASURING DEVICE AND COMPUTER PROGRAM PRODUCT FOR CARRYING OUT SUCH A METHOD

The invention relates to a method for classifying a type of bottom on a bottom under a liquid, which method comprises the step of performing an acoustic reflection measurement, in which a first attribute is determined which represents a strength with which acoustic waves are reflected from a location on the bottom through the liquid in a reflection direction.

Such a method is known and is used, for instance, in classification systems that distinguish types of sea bottoms, such as, for instance, sediment, coarse-grained sand or fine-grained sand, by means of sonar equipment. This involves a reflection measurement in a perpendicular direction below a ship, in which an acoustic signal is transmitted from the ship and subsequently the strength of the waves reflected by the bottom perpendicularly below the ship is measured. The reflected signal contains information about the sea bottom; from which material properties of the sea bottom can be retrieved.

Such measurements require a calibration of the reflected signal with the aid of sea bottom samples and prior reflection measurements. In the measurement, the strength of the reflected signal is determined. Next, based on the numerical value of the strength, the type of sea bottom is classified in accordance with the results of the calibration.

It has been found, however, that this classification method has a limited discriminatory power, thereby enabling only a very rough classification of the sea bottom. Moreover, as a consequence of this, to still enable discrimination between different types of bottom during any explorative trip, a very accurate calibration of the correspondence between measured reflections and type of bottom is necessary. This requires taking bottom samples regularly, which renders the classification time-consuming and costly.

Accurate and fast methods of classifying types of bottom under a liquid are of interest inter alia for planning and implementing dredging work, deploying fishing activities, constructing hydraulic engineering artifacts, tracing sea mines, and so forth.

The object of the invention is to provide a method whereby types of bottom under a liquid are classified in a more accurate manner. To that end, he method according to the invention is characterized in that it further comprises the steps of performing an acoustic scattering-measurement, in which a second attribute is determined of acoustic waves that are scattered essentially from the location on the bottom;

providing a search unit, which contains information with regard to different combinations of the values of the first and second attributes, and associates the combinations with respective bottom classifications; and identifying a bottom classification of the location on the basis of the bottom classification which the search unit associates with a combination of the first and second attributes.

Scattering measurements and reflection measurements are distinguished by the direction in which signals are scattered and reflected, respectively: scattering occurs in all possible directions, whereas reflection occurs only in particular directions in which returning waves that are generated spread over a surface interfere constructively. In measuring scattering, measurements on directions in which constructively interfering waves reflected against the bottom surface occur as well, are generally avoided.

It has been found that reflection and scattering measurements provide different kinds of information with regard to the type of bottom, which supplement each other in such a way that an essentially higher discriminatory power is achieved than is possible with reflection measurements alone. This has been found to enable a reliable classification with data from a one-time calibration of the types of bottom that correspond with different combinations of reflected and scattered signals.

By providing a search unit in which information has been programmed which associates different bottom classifications with respective combinations of strengths of reflected and scattered signals, it is rendered possible to automatically make a connection between acoustic measurements and types of bottom, so that the information obtained from the reflection and scattering measurement is coupled directly in order to come to a more accurate classification of the bottom.

Naturally, the reflection and scattering measurements need to relate to essentially the same location on the bottom under the liquid. Only then can the data of the measurements be combined to come to a reliable classification. Even so, it is not insurmountable if the reflection and scattering measurements do not relate to exactly the same location. For interpreting the measured data, there may be some distance between the locations of scattering and reflection, as long as this distance is smaller than the scale on which the bottom structure changes. As long as this is the case, at most locations reflection measurement and the scattering measurement together will yield the same result as when measurement takes place at exactly the same location. In the case of measurements from a ship, for instance, it will mostly suffice to combine a perpendicular reflection measurement and a scattering measurement from the same position of the ship. If desired, however, measurements from different positions may be combined to obtain more accurately corresponding locations on the bottom.

The mutually supplemental information of the reflection and scattering measurements is utilized by analyzing characteristics of the signals. This is done in an efficient manner by representing the temporal signals through an attribute. Thus, a first and a second attribute represents the strength of the reflected and the scattered signal.

For furthermore identifying a bottom classification of the location on the basis of the bottom classification which the search unit associates with a combination of the first and second attributes, the first and second attributes are fed to the search unit so that in effect a coupling is made between the combination of measured numerical values of the attributes on the one hand and the type of bottom on the other. This yields a bottom classification system that has a greater discriminatory power.

Advantageously, recording the reflected signal and the scattered signal comprises the step of normalizing the measured reflected and scattered signal by compensating for acoustic effects involved in at least propagation in the liquid.

Thus normalizing the measured signals advantageously yields a normalized measurement, making the classification possible under different conditions, for instance at different bottom depths, without requiring a new calibration. This compensation involves allowing for acoustic phenomena that occur upon propagation through the liquid and, for instance, at measurement in the receiver. Such effects comprise, for instance, the influence on the measured signal of the beam geometry of the transmitter and the distance traveled by the propagating wave. By modeling these interactions with suitably chosen parameters and associated numerical values, and by normalizing the recorded signal with these, a normalized reflected and scattered signal is made available, from which attributes are derived which are directly physically interpretable, such as, for instance, a reflection coefficient. Thus, a calibration of the measured signal on the basis of costly and time-consuming bottom samples has become superfluous, so that an inexpensive and fast classification method is obtained.

Preferably, the actuation and recording efficiency are also compensated for. Thus, with different types of receivers and/or transmitters, the same search information can be utilized to assign bottom classifications to combinations of the attributes. Consequently, only one type of search unit is needed and expensive calibrations for different equipment can be saved on.

In one embodiment of the method according to the invention, in which the waves for the scattering measurement and the reflection measurement are transmitted with transmitting means, the reflection measurement is performed such that measurement is done on waves traveling in a perpendicular direction from the transmitting means to the bottom and back. The scattering measurement is performed such that measurement is done on waves traveling at an angle relative to said perpendicular direction from the transmitting means to the bottom and back.

If within the framework of the scattering measurement a transmitter/receiver geometry is designed such that an actuation signal generated by the transmitter travels substantially the same propagation path as the scattered signal recorded by the receiver, but in mutually opposite directions, it is achieved that via an oblique measurement a transmitter of an actuation signal and the receiver of the scattered signal can be located in approximately the same place. With a view to avoiding long communication and feed lines, this considerably simplifies the arrangement of the transmitter and receiver geometry.

In another embodiment of the method according to the invention, performing the reflection measurement and scattering measurement comprises the step of generating just one actuation signal for the purpose of both measurements, yielding upon reflection and scattering of the one actuation signal at the bottom, both the reflected and the scattered signal, respectively. By generating an actuation signal with just a single transmitter for both the reflection measurement and the scattering measurement, a cheaper, simpler and faster measuring principle is obtained. In fact, a second transmitter is eliminated. Simplicity and speed of the measurements are possible in that it is possible to perform the management and the acquisition of the measured data more easily and in that in each case a double measurement is performed upon a single actuation.

In yet another embodiment of the method according to the invention, a single receiver records the reflected and scattered signal, with the reflected and scattered signal being identified by the use of a time window. What is thus achieved is that performing the reflection measurement and the scattering measurement requires just one receiver, which leads to a saving of costs and a simpler data processing structure. Because the reflected and scattered signal travel a different propagation path through the liquid, the two are separated from each other by a time window chosen in accordance with the propagation path.

The invention further relates to a measuring device with means for classifying a type of bottom under a liquid according to the above-described method.

Furthermore, the invention relates to a computer program product for classifying a type of bottom under a liquid, which computer program product contains instructions for causing the above-described method to be carried out.

Further advantageous embodiments of the invention are set forth in the subclaims.

The invention will be further elucidated with reference to an exemplary embodiment which is represented in the figures. In the figures.

The figures are only schematic representations of a preferred embodiment of the invention. In the figures, like parts are designated with the same reference numerals.

Figure 1:
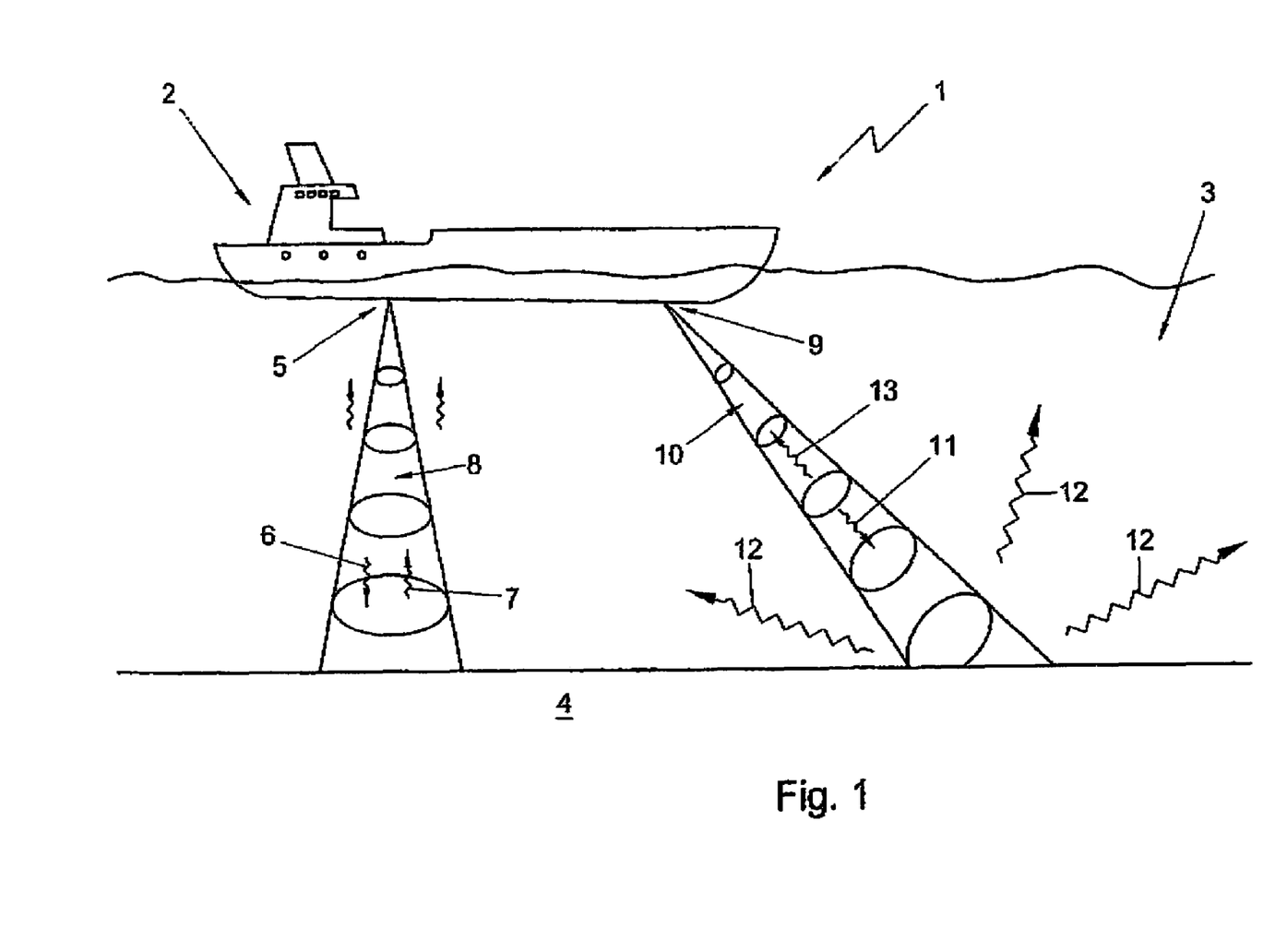
FIG. 1 shows a schematic side view of a measuring device according to the invention.

In FIG. 1, a measuring device 1 is represented, where a ship 2 is at sea 3 for performing acoustic measurements on the sea bottom 4. A transmitter 5 generates a first acoustic actuation signal 6, which reflects on the sea bottom 4. A reflected signal 7 is then recorded in a receiver 5 which has been integrated with the transmitter 5 into a single transducer 5. The actuation signal 6 forms part of a more or less focused, perpendicular beam 8, which is transmitted by the transducer 5, functioning as transmitter, also called sonar, with the spectrum being substantially above 50 kHz. A second transmitter/receiver configuration 9 generates, via another focused, oblique beam 10, a second acoustic actuation signal 11, which, after interaction at the sea bottom 4, is scattered in a variety of directions as a scattered field 12. A part of the scattered field 12 is detected as a scattered signal 13 in the second transmitter/receiver configuration 9.

Figure 2:
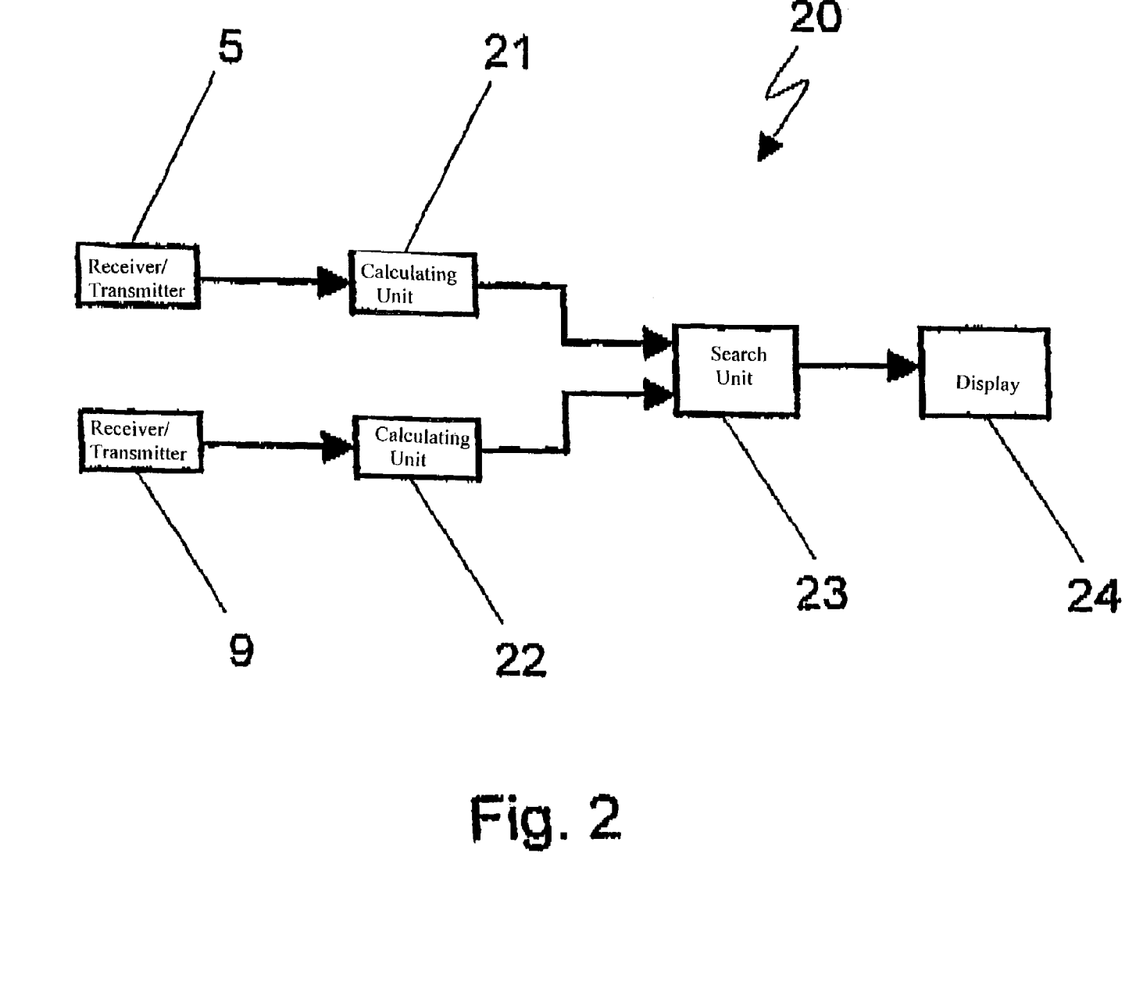
FIG. 2 shows a data processing device according to the invention.

FIG. 2 shows a data processing device 20 which represents the structure of the data processing equipment, which is program-controlled. The first and second transmitter/receiver configuration 5, 9 are respectively connected to a fist and second calculating unit 21, 22 for normalizing the recorded reflected and scattered signals 7, 13, respectively. Calculating units 21, 22 are coupled to a search unit 23, which has been programmed with information that assigns bottom type classifications to combinations of reflection and scattering measurements. (Although calculating units 21, 22 and search unit are shown separately, it is also possible, without departing from the invention, for two or more of these units, to make alternate use of one and the same computer alternately executing programs for reflection measurement and/or scattering measurement and/or searching).

In operation calculating units 21, 22 compensate for acoustic effects involved in generating the actuation signals 6, 11 (actuation) at the transmitters 5, 9, in propagation through the sea 3 (propagation) and in measuring the returning signals 7, 13 (recording) at the receivers 5, 9. So doing, only the effect of the bottom is left. Compensation for the effect of the transmitter and receiver involves, for instance, a coefficient which assigns a value to the conversion of an electronic signal to an acoustic signal and vice versa. In addition, gain factors in the electronics fulfilling, for instance, filter functions or signal conditioning functions at the transmitter/receiver are compensated.

For calculating the effect of the acoustic wave propagation on the strength of the signals, one of the relevant factors is the local sea depth. The compensation for the propagation of the acoustic signals through the sea can be effected, for instance, with the aid of a simulation, for calculating the effect of propagation, so that this can be compensated for in the measurements. Also relevant is the angle of the signal with respect to the sea bottom, since it influences the propagation distance and the magnitude of the surface reached with the wave. Further, in sea water, absorption may occur. Also, the pulse duration of the actuation signal influences the strength of the scattered signal. The simulation is done, for instance, with numerical propagation models known per se, which are based, for instance, on high-frequency approximation techniques. If need be, other simulation techniques can also be used, as for eliminating effects on the recorded signal resulting from sound waves being reflected or scattered several times between the sea bottom and the sea surface.

Calculating units 21, 22 furthermore extract information from the calibrated signals for determining a scalar first and second attribute representing the strength of the signals upon reflection and scattering. In the case of the reflection measurement, the attribute is, for instance, a reflection coefficient; that is, the ratio between amplitude or the intensity of the incoming and reflected waves. In the case of the scattering measurement, the attribute is preferably a measure for the roughness of the sea bottom. Suitable for this purpose is, for instance, a Lambert parameter $\mu$, which, as an empirical coefficient, is a measure for the roughness of the sea bottom. This parameter represents scattering upon extrapolation of scattering measurements as a function of the angle to an extrapolated scattering in the direction perpendicular to the sea surface given a completely vertically incident actuation wave. Within the framework of a Lambert model, the ratio of intensity between the actuation signal and measured scattered signal is proportional to $10^\mu \sin^2 \theta$, where $\theta$ is the angle of the direction of both the actuation and scattered signal relative to the sea bottom. Compensation of effects on the measured signals resulting from actuation, propagation and recording, as described above, can take place before as well as after extrapolation of the scattering measurement to the vertical incidence and scattering situation.

Figure 3:
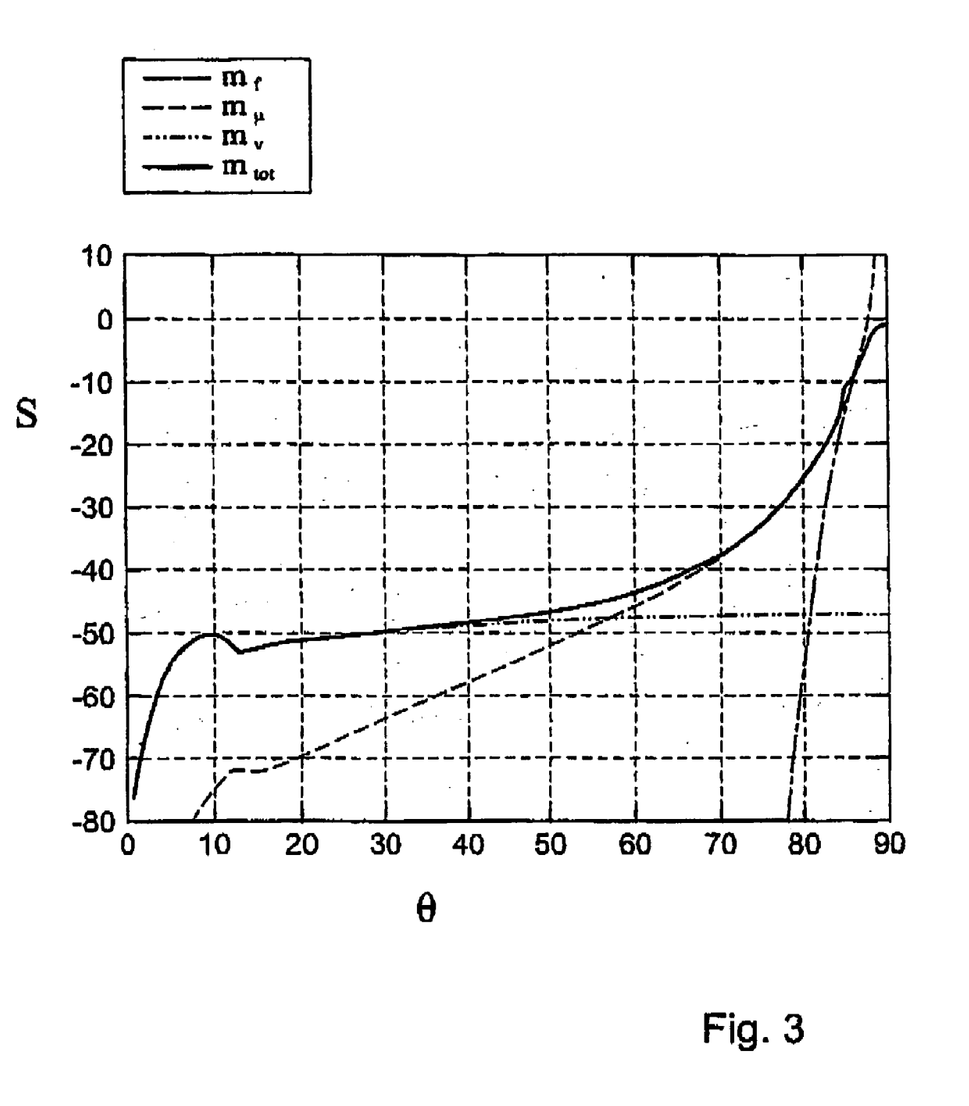
FIG. 3 shows a curve of measured scattering intensity (energy) as a function of the angle θ.

FIG. 3 shows, by way of illustration, a curve of measured scattering intensity S in dB (energy) as a function of the angle $\theta$ (the bold curve). The actuation pulse has a frequency of 1 kHz. Clear to see is the effect of the sinusoidal reduction of the scattering with decreasing angle.

Other scattering parameters are useful too, especially if such parameters are correlated to coefficients that describe the roughness of the bottom, such as, for instance, the variance of the depth as a function of the location or a spectrum of this depth function.

Figure 4:
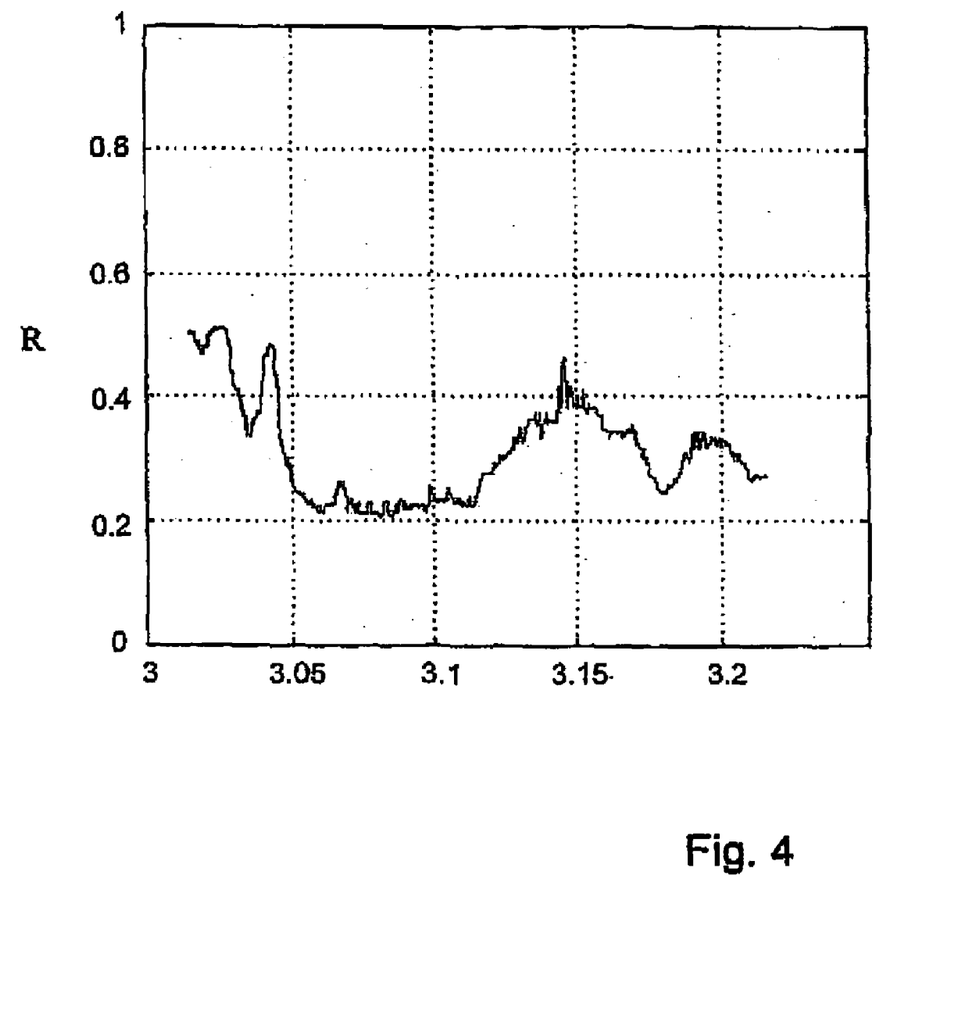
FIG. 4 shows a representation of a particular reflection factor as a function of the place.
Figure 5:
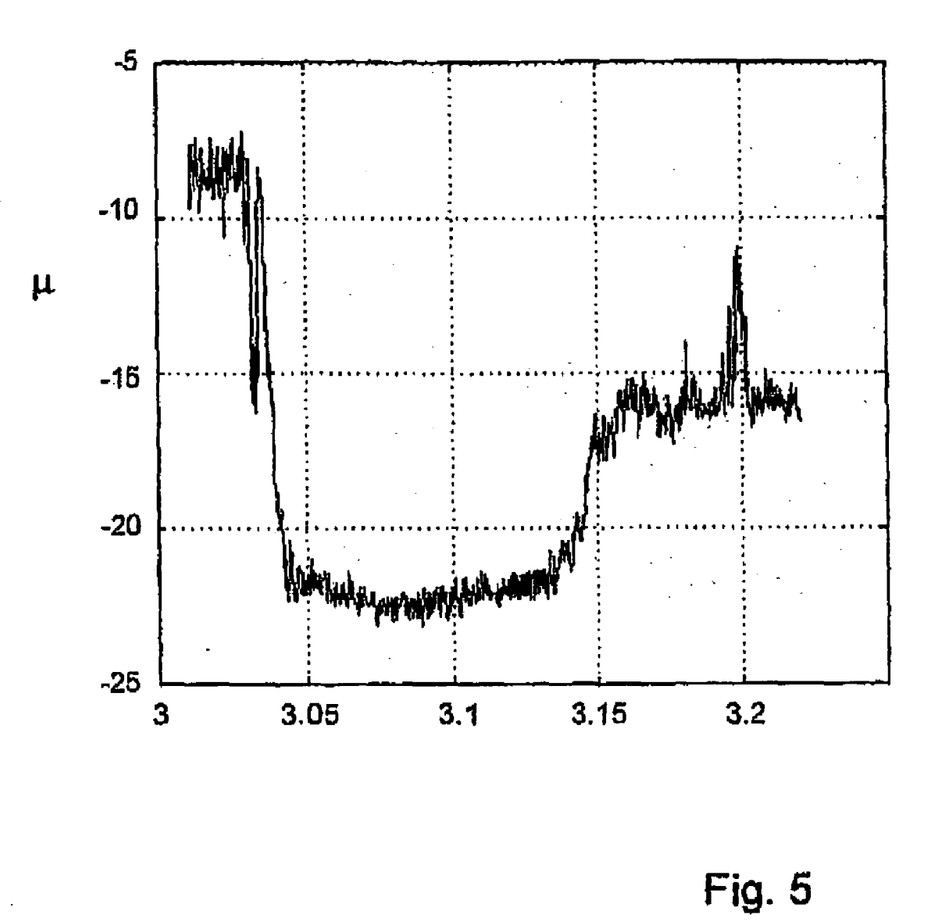
FIG. 5 shows a representation of a particular Lambert parameter as a function of the place.

FIG. 4 shows a representation of such an experimentally determined reflection coefficient R (vertical axis) as a function of the measuring location (horizontal axis). Similarly, FIG. 5 shows a representation of an experimentally determined Lambert scattering parameter $\mu$ (vertical axis) as a function of the measuring location (horizontal axis).

Search unit 23 includes programmed information which translates the combination of the value of the attributes into a bottom classification. This information is determined, for instance, a single time by means of calibration, whereby the attributes in question are measured at a number of sea bottom locations with known types of bottom. It has been found that with such information which has been determined a single time, a reliable classification is possible.

In order to have meaningful bottom classifications carried out, it is important that typical numerical values of types of bottom that may be expected to occur in a concrete measurement or series of measurements be available in the storage unit 23.

Calculating units 21, 22 feed the information obtained from the reflection and scattering measurement, in the form of the first and second attributes, to the search unit 23, which combines the numerical values of the attributes to come to a bottom classification. This search unit 23 provides a coupling between the numerical values of the attributes and a bottom classification, because information with regard to associations between strengths of reflected and scattered signals and types of bottom is available in it.

Figure 6:
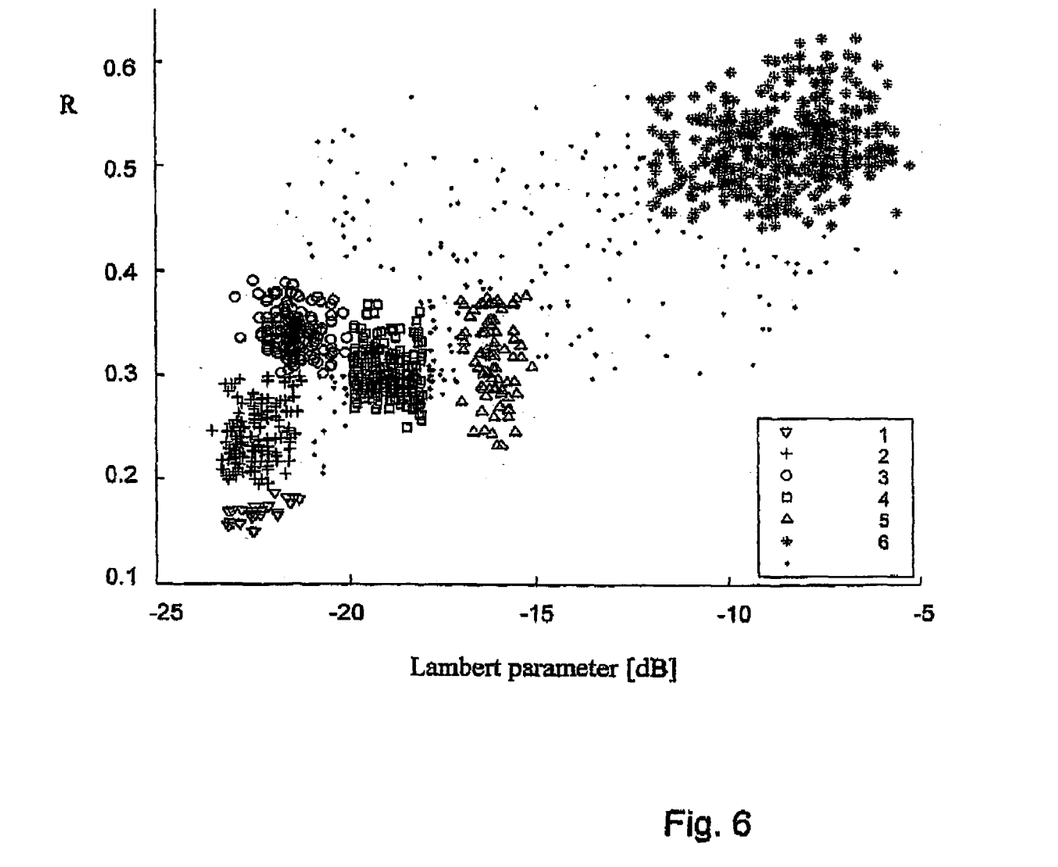
FIG. 6 shows a representation of a classification plot according to the invention.

FIG. 6 illustrates the programming of storage unit 23. The range of the first and second attributes can be imagined as a two-dimensional space or plane. Plotted in the horizontal direction is a Lambert parameter $\mu$ and in the vertical direction a reflection coefficient R. One reflection measurement in combination with one scattering measurement is depicted in this plane as a dot 30. It has been found that dots 30 relating to one type of bottom, for instance fine sand, can be depicted within a common sector 31. On the basis of information about correspondence between sectors 31 in the plane and types of sea bottom, the search unit 23 is able to carry out a bottom classification.

The classification is, for instance, implemented as follows. Numerical values of the two attributes are quantified and compared with a table in which a classification code is assigned to each combination of numerical values. The results of this are shown on a display 24.

The invention is not limited to the exemplary embodiment described here. Many variants are possible. Thus, in another embodiment according to the invention, the first transmitter 5 generates one actuation signal which, after reflection and interaction with the sea bottom 4, causes the recorded reflected and scattered signal 7, 13. What is thus achieved advantageously is that performing the reflection measurement and the scattering measurement requires only one transmitter configuration 5 and one actuation signal. The different signals that return after reflection and scattering are distinguished, for instance, with a time window, depending on the travel time of the waves, with the signals returning first (after perpendicular reflection) being interpreted as reflection, and signals that only return a particular time interval later being interpreted as scattering. This leads to lower costs and faster measurements. Also, without departing from the invention, for instance transmission and reception for reflection and/or scattering can be done from different ships. Or all calculations are performed with a single computer.

In principle, certainly if the sea is not so very deep, information about reflection and scattering that has been obtained with the ship in the same position can be combined with search unit 23. However, this may introduce an error in that reflection and scattering from different locations on the sea bottom are measured, because the reflection comes from a location perpendicular below the ship and the scattering is measured on waves that travel from and to the ship at an angle with the normal to the bottom. If desired, this can be corrected for by combining measurements which have been made while the ship was at different surface locations, so that the bottom locations from which scattering and reflection respectively are measured at those surface locations, lie as closely together as possible. This can be done, for instance, by measuring scattering from bottom locations that lie straight ahead in the course of the ship and combining these with later reflection measurements performed when the ship is above those bottom locations. Such locations can be simply determined with standard navigation techniques.

The invention claimed is:

1. A method for classifying a type of bottom on a bottom under a liquid, which method comprises the steps of
performing an acoustic reflection measurement, in which a first attribute is determined which represents a strength with which acoustic waves are reflected from a location on the bottom through the liquid in a reflection direction; characterized in that the method further comprises the steps of performing an acoustic scattering measurement, in which a second attribute is determined of acoustic waves that are scattered essentially from said location on the bottom;

providing a search unit, which contains information with regard to different combinations of the values of the first and second attributes, and associates said combinations with respective bottom types; and identifying a bottom type of said location on the basis of the bottom type which the search unit associates with a combination of the first and second attributes, wherein, the performing the acoustic reflection measurement is performed by a first transmitter transmitting a wave perpendicular from the first transmitter to the bottom and back, and the performing the acoustic scattering measurement is performed by a second transmitter transmitting waves traveling at an angle relative to said perpendicular direction from the second transmitter to the bottom and back.

2. A method according to claim 1, characterized in that performing the reflection measurement and the scattering measurement comprises the step of normalizing the measured reflected and scattered signal by compensating for acoustic effects involved in at least propagation in the liquid.

3. A method according to claim 1, characterized in that performing the reflection measurement and scattering measurement comprises the step of generating just one actuation signal for the purpose of both measurements, after which, upon reception, reflection and scattering of the one actuation signal are distinguished.

4. A method according to claim 3, characterized in that just one receiver records the reflected and scattered signal, with the reflected and scattered signal being distinguished by the use of a time window.

5. A method according to claim 1, characterized in that the second attribute represents a Lambert scattering parameter.

6. A method according to claim 1, characterized in that an actuation signal with a frequency spectrum that is substantially above 50 kHz causes the scattered signal.

7. A measuring device for classifying a type of bottom under a liquid, which device is provided with transmitting means arranged for generating acoustic actuation signals;

receiving means arranged for recording a first attribute of a reflected signal that is reflected from a location on the bottom through the liquid in a reflection direction;

calculating means arranged for assigning a bottom classification on the basis of the first attribute, characterized in that the receiving means are further arranged for distinguishing a signal scattered from the bottom and recording a second attribute of the scattered signal, and that the calculating means comprise a search unit in which information has been programmed which associates bottom types with respective combinations of values of the first and second attributes, while the calculating means are arranged for identifying the bottom type by associating a combination of the first and second attributes with information from the search unit, wherein, the transmitting means and the receiving means respectively comprise:

a first transmitter and a first receiver for the purpose of the reflection measurement, the first transmitter and the first receiver being designed with a single transducer, the first transmitter transmitting a wave in a direction perpendicular from the first transmitter to the bottom and back, and a second transmitter and a second receiver for the purpose of the scattering measurement, the second transmitter and the second receiver being designed with a single transducer, the second transmitter transmitting a wave at an angle relative to said perpendicular direction from the second transmitter to the bottom and back.

8. A measuring device according to claim 7, characterized in that the receiving means comprise a receiver which is arranged for recording both the reflected and the scattered signal, and for distinguishing the respective signals by the use of a time window.

9. A computer program product embodied in a computer-readable medium, for classifying a type of bottom under a liquid, which computer program product comprises instructions for causing the following steps to be carried out:

recording a first attribute of a reflected signal of a reflection measurement on acoustic waves being reflected from a location on the bottom through the liquid in a reflection direction;

recording a second attribute of a scattered signal of a scattering measurement on acoustic waves being scattered essentially from said location on the bottom; and assigning different bottom types to respective combinations of values of the first and second attributes, wherein the reflection measurement is performed by a first transmitter transmitting waves traveling in a direction perpendicular from the first transmitter to the bottom and back and that the scattering measurement is performed by a second transmitter transmitting waves traveling at an angle relative to said perpendicular direction from the second transmitter to the bottom and back.

10. A computer program product embodied in a computer-readable medium, according to claim 9, characterized in that the product further contains instructions for causing the following steps to be carried out:

measuring the reflected and scattered signal with the aid of a receiver, and normalizing the measured reflected and scattered signal by compensating for acoustic effects involved in at least propagation in the liquid.

11. A method according to claim 2, characterized in that performing the reflection measurement and scattering measurement comprises the step of generating just one actuation signal for the purpose of both measurements, after which, upon reception, reflection and scattering of the one actuation signal are distinguished.

12. A method according to claim 1, characterized in that performing the reflection measurement and scattering measurement comprises the step of generating just one actuation signal for the purpose of both measurements, after which, upon reception, reflection and scattering of the one actuation signal are distinguished.

13. A method according to claim 2, characterized in that the second attribute represents a Lambert scattering parameter.

14. A method according to claim 1, characterized in that the second attribute represents a Lambert scattering parameter.

15. A method according to claim 3, characterized in that the second attribute represents a Lambert scattering parameter.

16. A method according to claim 4, characterized in that the second attribute represents a Lambert scattering parameter.

17. The method according to claim 1, further comprising:

displaying said identified bottom type as different character in a display grid of said location.

* * * * *